United States Patent
Chen et al.

(10) Patent No.: US 11,150,740 B2
(45) Date of Patent: Oct. 19, 2021

(54) KEY STRUCTURE

(71) Applicant: Acer Incorporated, New Taipei (TW)

(72) Inventors: Hung-Chi Chen, New Taipei (TW);
Chi-Hung Lai, New Taipei (TW);
Chuan-Hua Wang, New Taipei (TW);
Pin-Chueh Lin, New Taipei (TW);
Ching-Piao Kuan, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/993,268

(22) Filed: Aug. 14, 2020

(65) Prior Publication Data
US 2021/0109602 A1   Apr. 15, 2021

(30) Foreign Application Priority Data

Oct. 14, 2019 (TW) ................................ 108136856

(51) Int. Cl.
| | |
|---|---|
| *G06F 3/02* | (2006.01) |
| *H01H 13/12* | (2006.01) |
| *H01H 13/52* | (2006.01) |
| *G05G 1/02* | (2006.01) |
| *G05G 5/05* | (2006.01) |

(Continued)

(52) U.S. Cl.
CPC ............ *G06F 3/0202* (2013.01); *G05G 1/02* (2013.01); *G05G 5/04* (2013.01); *G05G 5/05* (2013.01); *H01H 13/14* (2013.01); *G05G 2505/00* (2013.01); *H01H 13/52* (2013.01); *H01H 2221/058* (2013.01)

(58) Field of Classification Search
CPC .. G05G 1/02; G05G 5/04; G05G 5/05; G05G 2505/00; H01H 13/14; H01H 13/52; H01H 2221/058; G06F 3/0202
See application file for complete search history.

(56) References Cited

U.S. PATENT DOCUMENTS

| 6,761,494 B2* | 7/2004 | Hsu ........................ H01H 3/125 |
|---|---|---|
| | | 200/343 |
| 9,741,502 B2* | 8/2017 | Zou ........................ H01H 13/84 |
| 9,959,991 B2* | 5/2018 | Chen ...................... H01H 13/52 |

(Continued)

FOREIGN PATENT DOCUMENTS

| CN | 2155620 | 2/1994 |
|---|---|---|
| CN | 204465499 | 7/2015 |

(Continued)

*Primary Examiner* — Adam D Rogers
(74) *Attorney, Agent, or Firm* — JCIPRNET

(57) ABSTRACT

A key structure includes a base plate, a key cap disposed above the base plate, a scissor abutting against the base plate and the key cap, a spring abutting against the key cap, a positioning base connected to the key cap, a first cover connected to the positioning base and a second cover slidably connected to the first cover. The scissor, the spring, the positioning base, the first cover and the second cover are located between the base plate and the key cap. The positioning base has a positioning groove and a part of the spring is located in the positioning groove. The first cover has a through hole overlapped with the positioning groove, and the spring penetrates the through hole. The second cover penetrates the through hole and abuts against the base plate, and another part of the spring abuts against the second cover.

10 Claims, 8 Drawing Sheets

(51) Int. Cl.
*H01H 13/14* (2006.01)
*G05G 5/04* (2006.01)

(56) References Cited

U.S. PATENT DOCUMENTS

| | | | |
|---|---|---|---|
| 10,410,805 B1* | 9/2019 | Chen | H01H 13/14 |
| 10,714,281 B2* | 7/2020 | Chen | H01H 3/125 |
| 2020/0152402 A1* | 5/2020 | Su | G06F 3/0202 |

FOREIGN PATENT DOCUMENTS

| | | |
|---|---|---|
| CN | 204809086 | 11/2015 |
| CN | 209343971 | 9/2019 |
| TW | 201812816 | 4/2018 |
| TW | I665701 | 7/2019 |

* cited by examiner

KEY STRUCTURE

CROSS-REFERENCE TO RELATED APPLICATION

This application claims the priority benefit of Taiwan application no. 108136856, filed on Oct. 14, 2019. The entirety of the above-mentioned patent application is hereby incorporated by reference herein and made a part of this specification.

TECHNICAL FIELD

The invention relates to a key structure, and more particularly, to a key structure applied to a keyboard.

BACKGROUND

As a common physical input device, the keyboard is widely used in desktop computers, notebook computers or other electronic devices. In general, a shaft body adopted by the key structure in the keyboard is usually a mechanical shaft, a rubber dome shaft or a spring shaft. Taking the key structure using the spring shaft as an example, the spring shaft may be a compression spring. Two ends of the compression spring respectively abut a key cap and a base plate, and the rest of the compression spring is mostly exposed to the outside. Therefore, the key structure using the spring shaft often has the following problems: the deflection is easy to occur when the force is pressed; the compression spring is easily damaged.

How to overcome the above problems has become a research project actively invested by relevant manufacturers.

SUMMARY

The invention provides a key structure that helps to improve operational stability.

The key structure in an embodiment of the invention includes a base plate, a key cap, a scissor, a spring, a positioning base, a first cover and a second cover. The key cap is disposed above the base plate. The scissor, the spring, the positioning base, the first cover and the second cover are located between the base plate and the key cap. The scissor abuts against the base plate and the key cap. The spring abuts against the key cap. The positioning base is connected to the key cap, wherein the positioning base has a positioning groove, and a part of the spring is located in the positioning groove. The first cover is connected to the positioning base, wherein the first cover has a through hole overlapped with the positioning groove, and the spring penetrates the through hole. The second cover is slidably connected to the first cover. The second cover penetrates the through hole and abuts against the base plate, and another part of the spring abuts against the second cover and is covered by the second cover.

Based on the above, in the key structure of the invention, since the spring is covered and protected by the positioning base, the first cover and the second cover, the spring is less likely to be broken or damaged. On the other hand, the engagement of the positioning base, the first cover and the second cover can be used to guide the compression and recovery directions of the spring to prevent the key cap moving up and down relative to the base plate from being deflected, thereby improving stability when the user is operating with the key structure.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
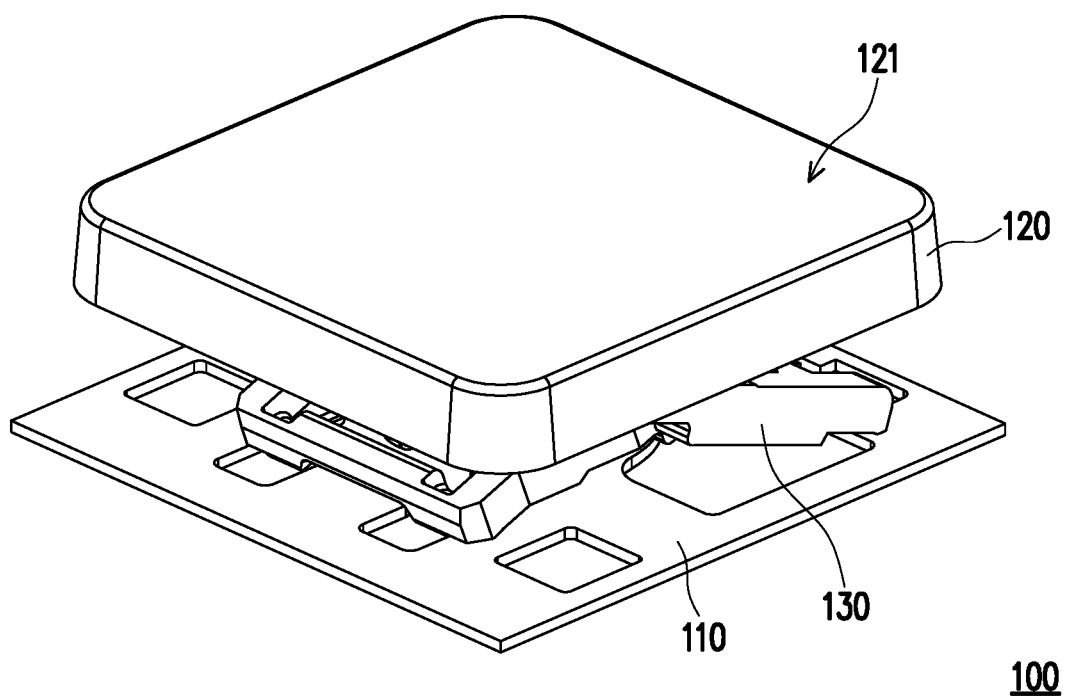
FIG. 1 is a schematic view of a key structure in an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
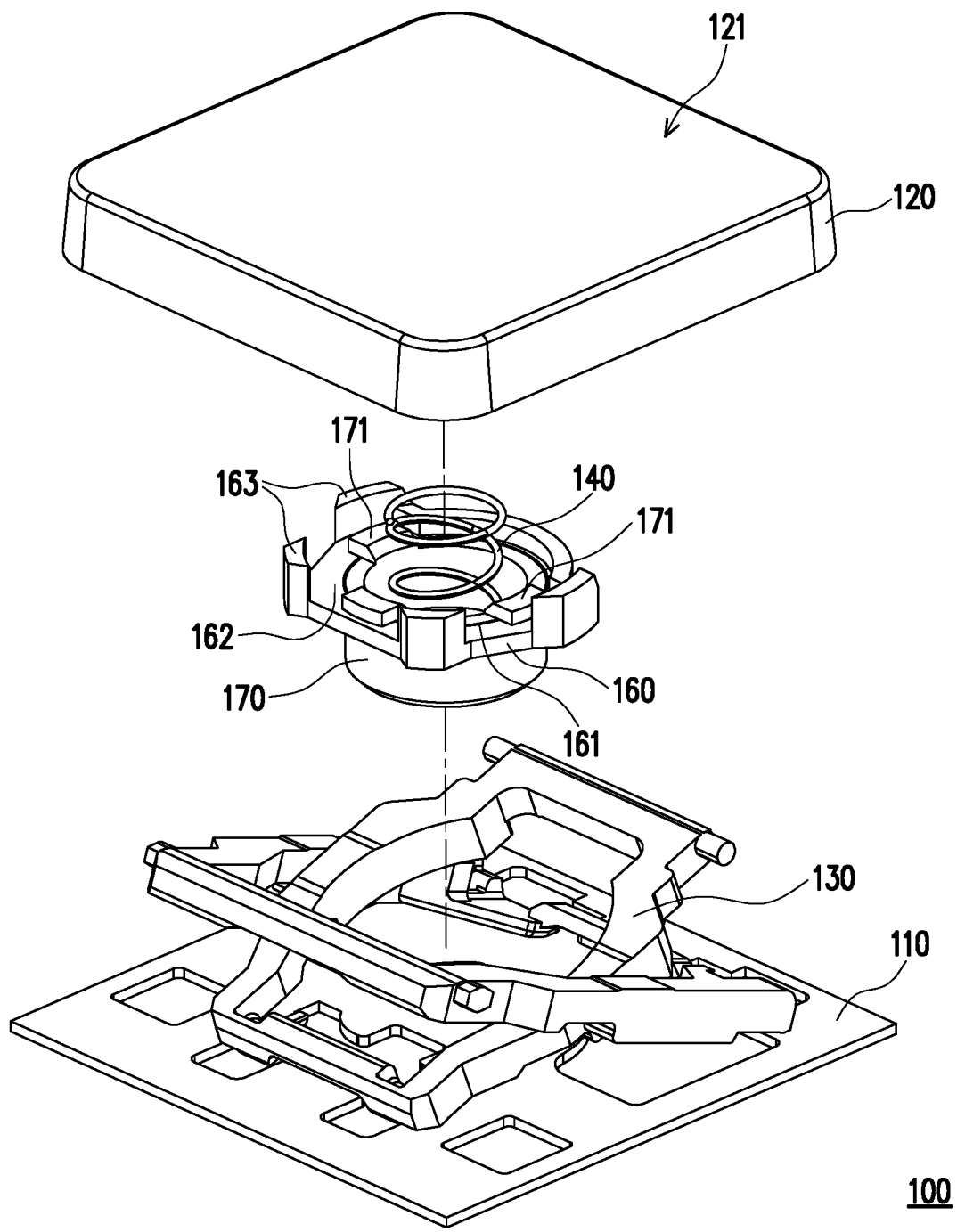
FIG. 2 and FIG. 3 are explosion views of the key structure of FIG. 1 at two different viewing angles.
Figure 3:
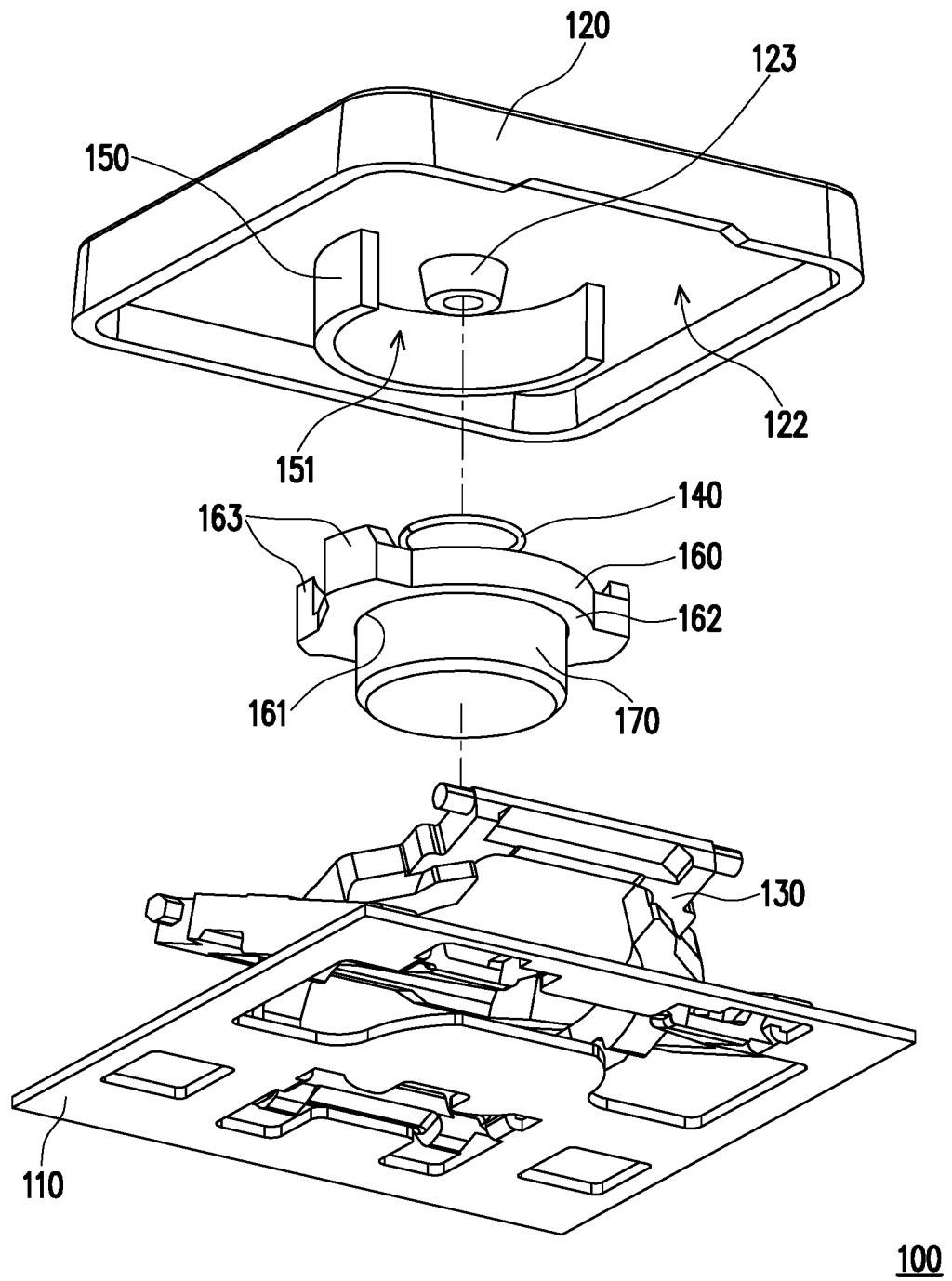
Figure 4:
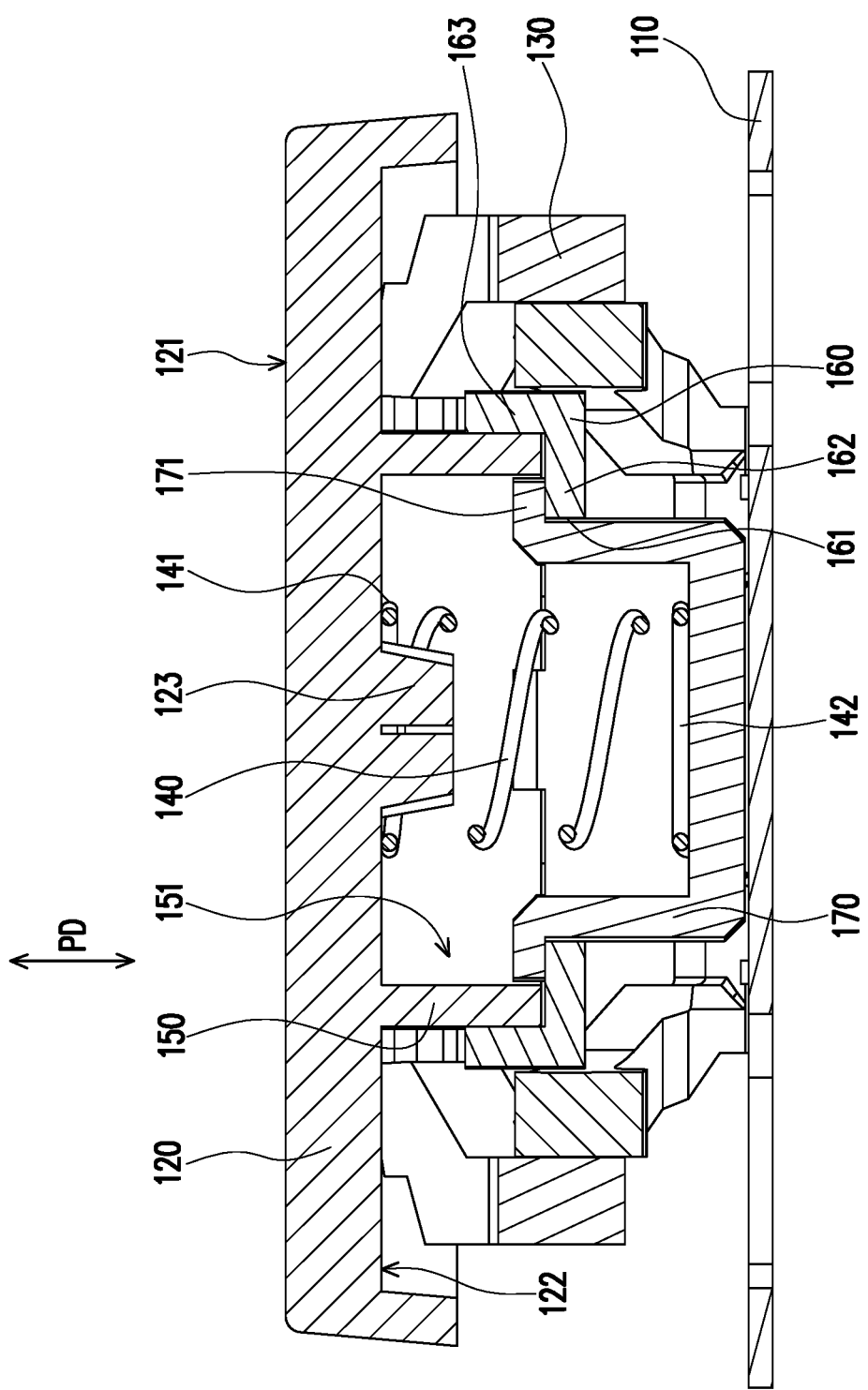
FIG. 4 is a cross-sectional view of the key structure of FIG. 1.

FIG. 1 is a schematic view of a key structure in an embodiment of the invention. FIG. 2 and FIG. 3 are explosion views of the key structure of FIG. 1 at two different viewing angles. FIG. 4 is a cross-sectional view of the key structure of FIG. 1. Referring to FIG. 1 to FIG. 4, in this embodiment, a key structure 100 is applicable to a keyboard and used by a user as a physical operating interface for inputting signals to the desktop computers, the notebook computers or the other electronic devices.

Specifically, the key structure 100 includes a base plate 110, a key cap 120, a scissor 130, a spring 140, a positioning base 150, a first cover 160 and a second cover 170. The key cap 120 is disposed above the base plate 110, and the scissor 130, the spring 140, the positioning base 150, the first cover 160 and the second cover 170 are located between the base plate 110 and the key cap 120. For instance, the scissor 130 includes two movable legs. Each of the movable legs may be a rectangular frame body surrounding the spring 140, the positioning base 150, the first cover 160 and the second cover 170.

Referring to FIG. 2 to FIG. 4, the scissor 130 abuts against the base plate 110 and the key cap 120, and is configured to maintain stability when the key cap 120 moves up and down relative to the base plate 110. On the other hand, the spring 140 abuts against the key cap 120 and the base plate 110. Here, the spring 140 may adopt the compression spring, and an engagement of the scissor 130 and the spring 140 can support the key cap 120. When the key cap 120 is pressed to move toward the base plate 110, the scissor 130 is lowered and the spring 140 is compressed. The compressed spring 140 generates the reaction force to the key cap 120 to prevent the key cap 120 from falling instantaneously. After the pressing force applied to the key cap 120 is removed, the elastic force of the spring 140 drives the scissor 130 and the key cap 120 to rise. Therefore, other than driving the scissor 130 and the key cap 120 back to the original positions, the elastic force of the spring 140 may also provide a favorable tactile sensation.

The positioning base 150 is connected to the key cap 120. The key cap 120 has a pressing surface 121 for the user to press and an inner surface 122 facing the base plate 110, and the positioning base 150 is connected to the inner surface 122. The positioning base 150 may be integratedly formed on the inner surface 122 of the key cap 120, or securely locked on the inner surface 122 of the key cap 120, securely adhered on the inner surface 122 of the key cap 120, or engaged with the inner surface 122 of the key cap 120. The positioning base 150 has a positioning groove 151, and exposes the inner surface 122 of the key cap 120. A part of the spring 140 is located in the positioning groove 151, and abuts against the inner surface 122 of the key cap 120.

Referring to FIG. 2 to FIG. 4, in this embodiment, the first cover 160 is connected to the positioning base 150. Here, the first cover 160 may be a positioning ring, and securely slipped onto the positioning base 150. The first cover 160 has a through hole 161 overlapped with the positioning groove 151. The spring 140 extends from the positioning groove 151 toward the base plate 110, and penetrates the through hole 161. On the other hand, the second cover 170 is slidably connected to the first cover 160 and the positioning base 150, and the first cover 160 is slipped onto the second cover 170 to prevent the second cover 170 from being disengaged with the positioning base 150.

Further, the second cover 170 penetrates the through hole 161 and abuts against the base plate 110, and the spring 140 extending toward the base plate 110 is inserted into the second cover 170 and abuts against the second cover 170. In other words, another part of the spring 140 abuts against the second cover 170 and is covered by the second cover 170. Furthermore, the spring 140 includes a first end 141 and a second end 142 opposite to the first end 141. Here, the first end 141 is inserted into the positioning groove 151 and abuts against the inner surface 122 of the key cap 120, and the second end 142 is inserted into and abuts against the second cover 170 to abut against the base plate 110 through the second cover 170.

In this embodiment, a slippage amount of the second cover 170 is substantially determined by a depth of the positioning groove 151, and a compression amount of the spring 140 is substantially determined by the slippage amount of the second cover 170. On the other hand, the key cap 120 includes a positioning protrusion 123 protruding from the inner surface 122. The positioning protrusion 123 is located in the positioning groove 151. The first end 141 of the spring 140 is slipped onto the positioning protrusion 123, and configured to secure a position of the spring 140 on the inner surface 122 of the key cap 120 to prevent the spring 140 from slipping arbitrarily relative to the key cap 120.

When the user presses down the key cap 120, the key cap 120, the positioning base 150 and the first cover 160 move toward the base plate 110, and the second cover 170 slides relative to the first cover 160 and the positioning base 150. The second cover 170 moves into the positioning groove 151 through the through hole 161, and moves close to the inner surface 122 of the key cap 120 so that spring 140 is compressed. As a distance between the second cover 170 and the inner surface 122 of the key cap 120 is reduced, the compression amount of the spring 140 is greater. When the second cover 170 is structurally interfered with the inner surface 122 of the key cap 120, the second cover 170 stops sliding relative to the first cover 160 and the positioning base 150 and the spring 140 has the maximum compression amount.

Since the spring 140 is covered and protected by the positioning base 150, the first cover 160 and the second cover 170, the spring 140 is less likely to be broken or damaged. On the other hand, an engagement of the positioning base 150, the first cover 160 and the second cover 170 can be used to guide the compression and recovery directions of the spring 140 to prevent the key cap 120 moving up and down relative to the base plate 110 from being deflected, thereby improving stability when the user is operating with the key structure 100.

Referring to FIG. 2 to FIG. 4, in this embodiment, the second cover 170 penetrates the through hole 161. The second cover 170 includes a side protrusion 171, and the side protrusion 171 is slidably disposed in the positioning groove 151. The first cover 160 is slipped onto the positioning base 150, and an outer diameter of the side protrusion 171 is greater than an inner diameter of the through hole 161. In the case where the key cap 120 moves away from the base plate 110, the side protrusion 171 can provide a limiting effect to prevent the second cover 170 from being disengaged with the positioning base 150.

In details, the first cover 160 includes a limiting portion 162 far away from the inner surface 122 of the key cap 120, and the limiting portion 162 surrounds the through hole 161. In an orthographic projection direction PD perpendicular to the inner surface 122 of the key cap 120, an orthographic projection of the limiting portion 162 on the inner surface 122 of the key cap 120 falls in the positioning groove 151. In other words, the limiting portion 162 of the first cover 160 is located on a sliding path of the second cover 170, so as to provide a limiting effect for the side protrusion 171 of the second cover 170. On the other hand, the first cover 160 further includes a plurality of hooking portions 163 surrounding the limiting portion 162, and the plurality of hooking portions 163 are engaged with the positioning base 150 and located outside the positioning groove 151.

When the user presses down the key cap 120, the key cap 120, the positioning base 150 and the first cover 160 move toward the base plate 110, and the side protrusion 171 of the second cover 170 slides toward the inner surface 122 of the key cap 120. When the side protrusion 171 of the second cover 170 is structurally interfered with the inner surface 122 of the key cap 120, the second cover 170 stops sliding relative to the first cover 160 and the positioning base 150. After the pressing force applied to the key cap 120 is removed, the elastic force of the spring 140 drives the key cap 120, the positioning base 150 and the first cover 160 to move away from the base plate 110. When the side protrusion 171 of the second cover 170 is structurally interfered with the limiting portion 162 of the first cover 160, the key cap 120 stops moving away from the base plate 110. Accordingly, the side protrusion 171 of the second cover 170 is limited to slide between the inner surface 122 of the key cap 120 and the limiting portion 162 of the first cover 160.

Figure 5:
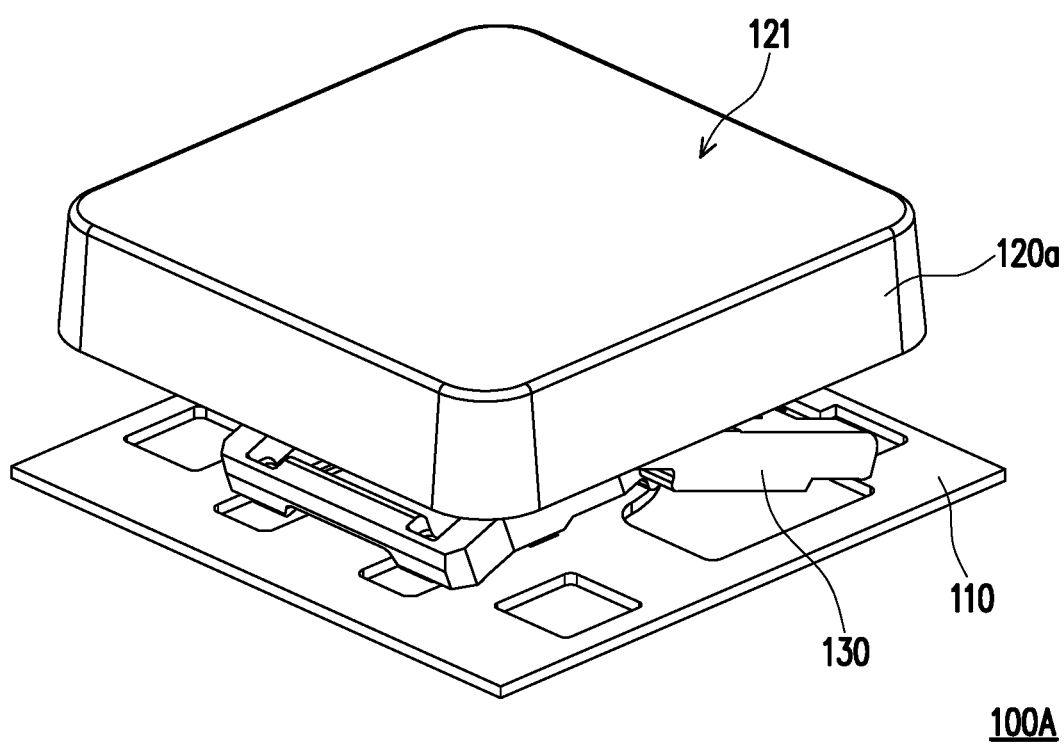
FIG. 5 is a schematic view of a key structure in another embodiment of the invention.
Figure 6:
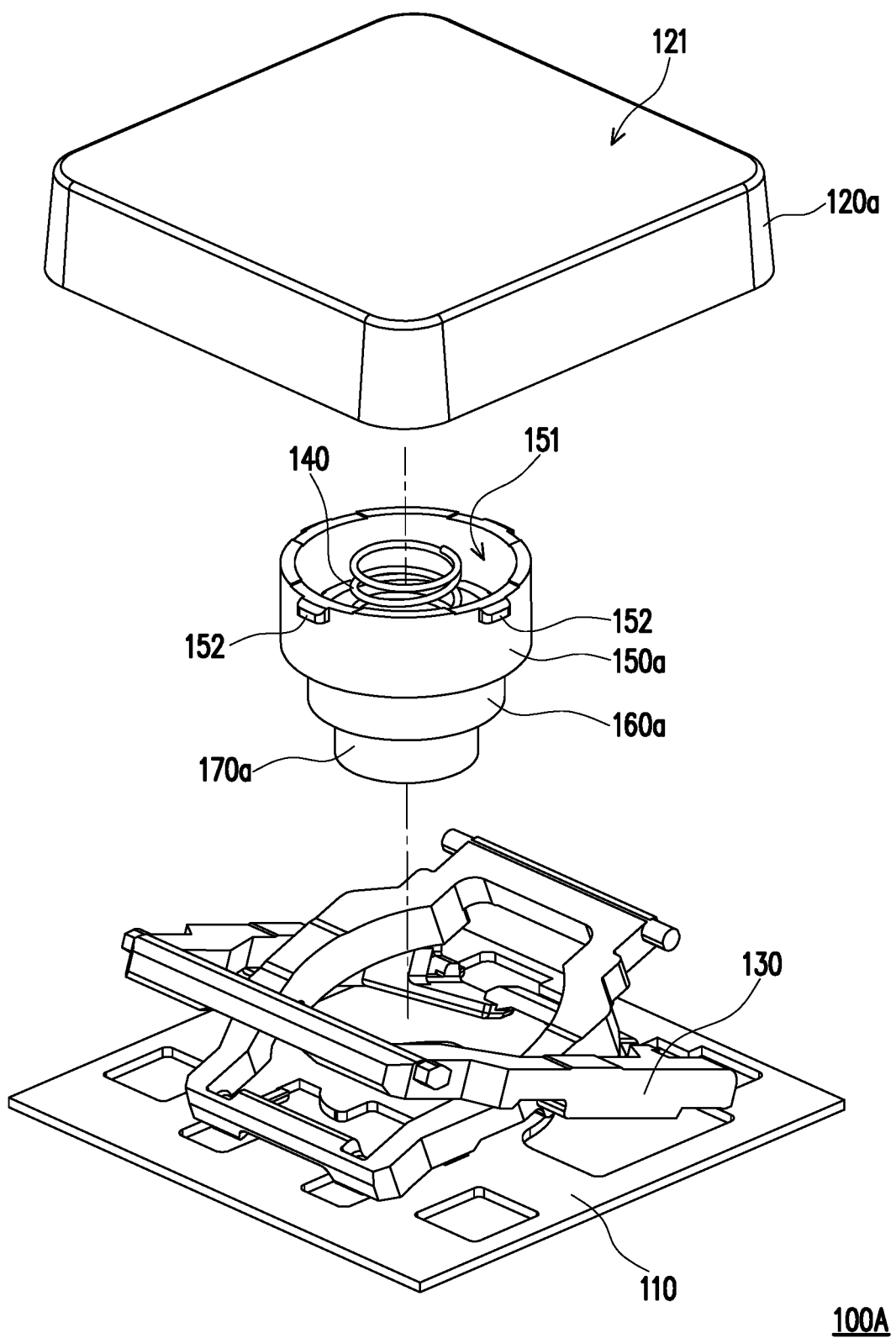
FIG. 6 and FIG. 7 are explosion views of the key structure of FIG. 5 at two different viewing angles.
Figure 7:
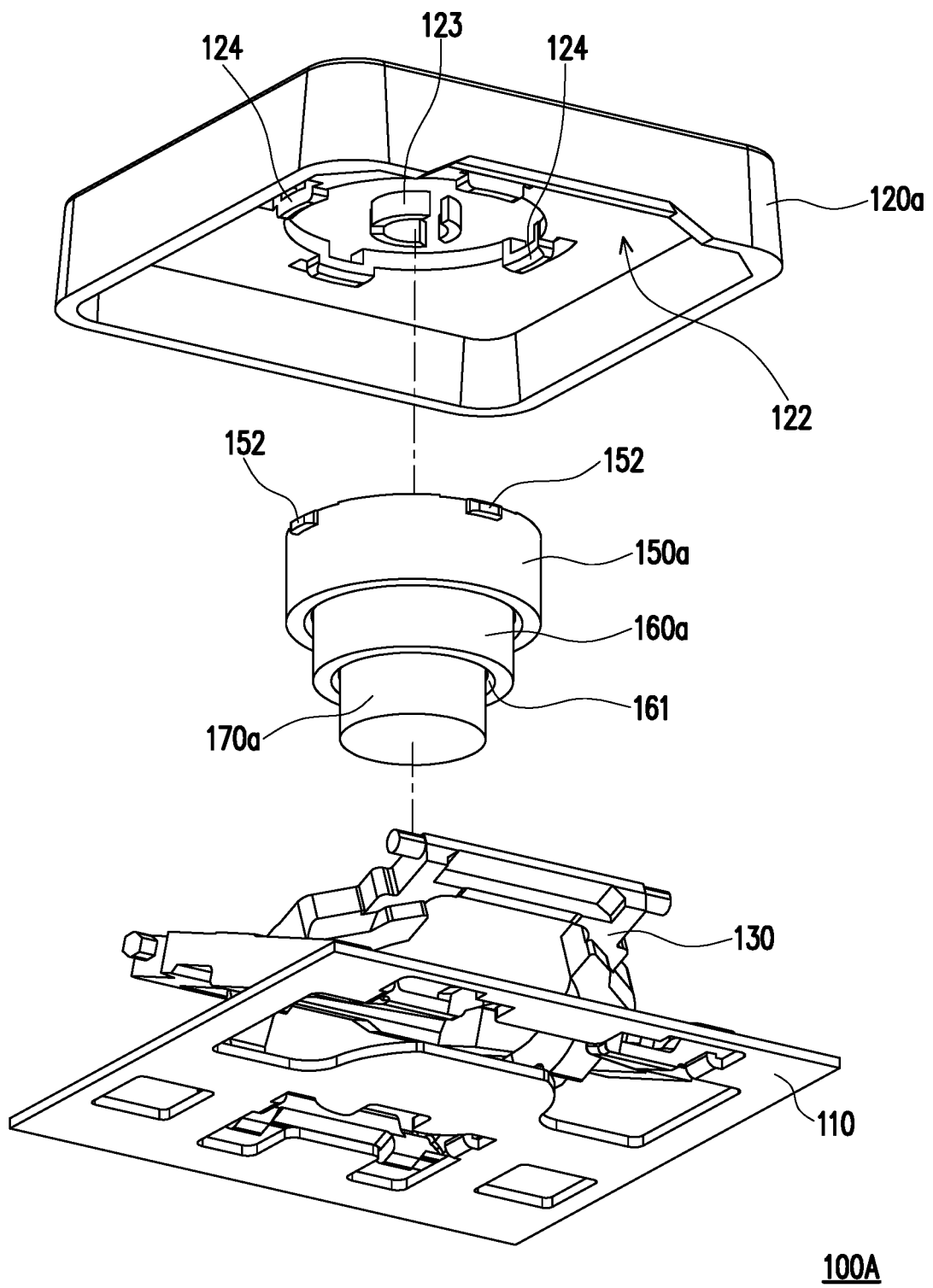
Figure 8:
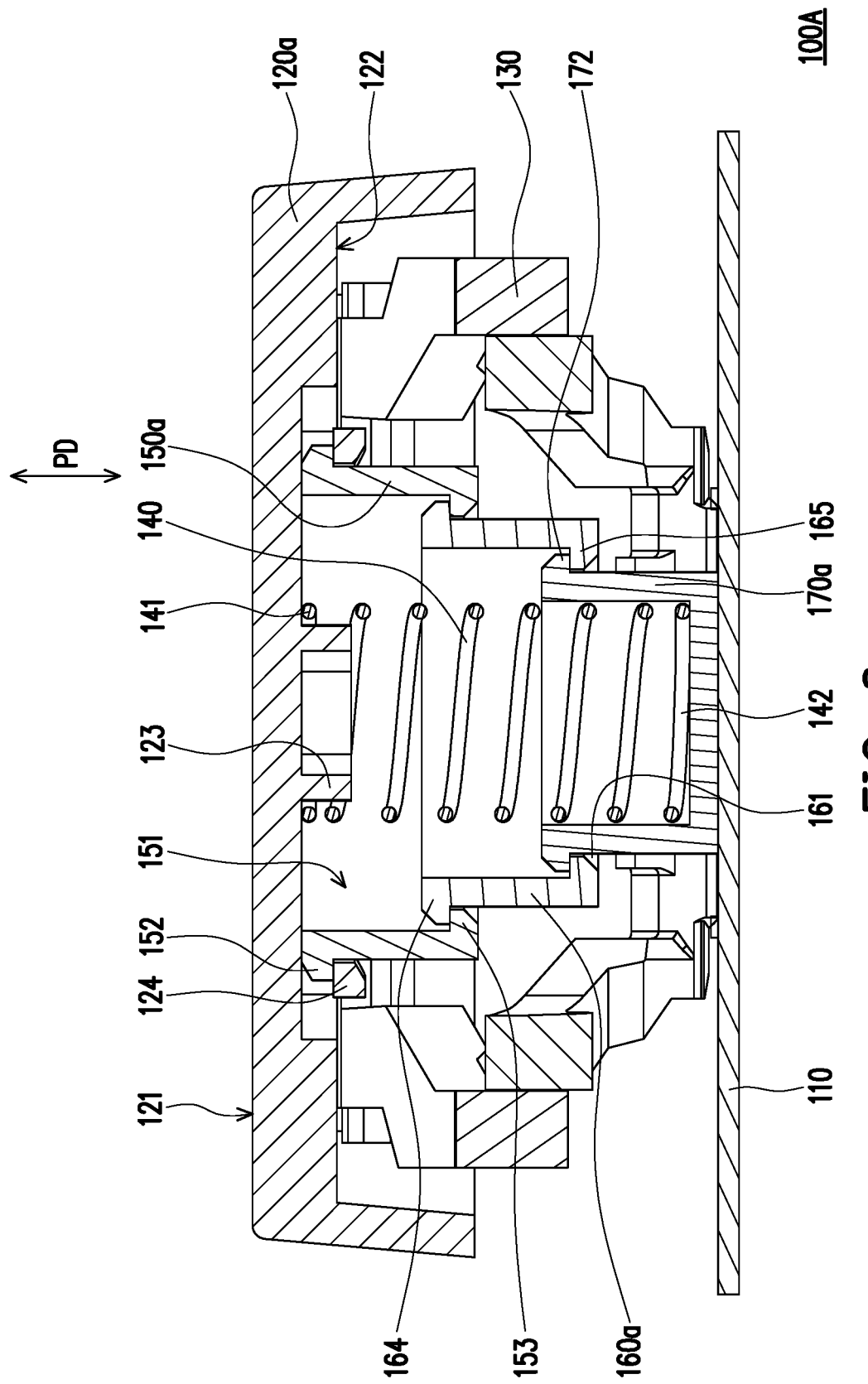
FIG. 8 is a cross-sectional view of the key structure of FIG. 5.

FIG. 5 is a schematic view of a key structure in another embodiment of the invention. FIG. 6 and FIG. 7 are explosion views of the key structure of FIG. 5 at two different viewing angles. FIG. 8 is a cross-sectional view of the key structure of FIG. 5. Referring to FIG. 5 to FIG. 8, a key structure 100A of the present embodiment is substantially similar to the key structure 100 of the previous embodiment. The main difference between the two is the design of the positioning base, the first cover and the second cover.

In this embodiment, a key cap 120a includes a first engaging portion 124 facing the base plate 110, and a positioning base 150a includes a second engaging portion 152 located outside the positioning groove 151. The first engaging portion 124 and the second engaging portion 152 may be a combination of a locking slot and a locking hook, and the second engaging portion 152 is engaged with the first engaging portion 124 to fix the positioning base 150a to the inner surface 122 of the key cap 120a.

The positioning base 150a is slipped onto a first cover 160a, and the first cover 160 is slipped onto a second cover 170a. Further, the first cover 160a is slidably connected to the positioning base 150a, and the second cover 170 is slidably connected to the first cover 160a. On the other hand, the spring 140 penetrates the first cover 160a from the positioning groove 151 of the positioning base 150a and is inserted into the second cover 170, and a compression amount of the spring 140 is substantially determined by a slippage amount of the second cover 170a and a slippage amount of the first cover 160a.

Referring to FIG. 6 to FIG. 8, when the user presses down the key cap 120a, the key cap 120a, the positioning base 150a and the first cover 160a move toward the base plate 110, and the second cover 170 slides relative to the first cover 160a. The second cover 170a moves into the first cover 160a through the through hole 161 so that the spring 140 is compressed. When the first cover 160a is structurally interfered with the base plate 110, the second cover 170a stops sliding. Then, the first cover 160a slides relative to the positioning base 150a and moves into the positioning groove 151 while the spring is continuously compressed. When the first cover 160a is structurally interfered with the internal surface 122 of the key cap 120a, the first cover 160a stops sliding. At the time, the second cover 170a may completely move into the first cover 160a.

As described above, an engagement of the spring 140, the positioning base 150a, the first cover 160a and the second cover 170a may generate a sectionalized press stroke which provides a sectionalized tactile sensation as feedback for the user.

In this embodiment, the positioning base 150a includes a first limiting portion 153 far away from the inner surface 122 of the key cap 120a. In an orthographic projection direction PD perpendicular to the inner surface 122 of the key cap 120a, an orthographic projection of the first limiting portion 153 on the inner surface 122 of the key cap 120a falls in the positioning groove 151. On the other hand, the first cover 160a includes a first side protrusion 164, and the first side protrusion 164 is slidably disposed in the positioning groove 151. In other words, the first limiting portion 153 of the positioning base 150a is located on a sliding path of the first side protrusion 164 of the first cover 160a.

The first cover 160a further includes a second limiting portion 165 opposite to the first side protrusion 164. The second limiting portion 165 is far way from the inner surface 122 of the key cap 120a and surrounds the through hole 161. In the orthographic projection direction PD perpendicular to the inner surface 122 of the key cap 120a, an orthographic projection of the second limiting portion 165 on the inner surface 122 of the key cap 120a falls in the positioning groove 151. On the other hand, the second cover 170a penetrates the through hole 161. Here, the second cover 170a includes a second side protrusion 172, and the second side protrusion 172 is slidably disposed in the first cover 160a. In other words, the second limiting portion 165 of the first cover 160a is located on a sliding path of the second side protrusion 172 of the second cover 170a.

In the case where the key cap 120a moves away from the base plate 110, the first limiting portion 153 of the positioning base 150a can provide a limiting effect for the first side protrusion 164 of the first cover 160a to prevent the first cover 160a from being disengaged with the positioning base 150a. On the other hand, the second limiting portion 165 of the first cover 160a can provide a limiting effect for the second side protrusion 172 of the second cover 170a to prevent the second cover 170a from being disengaged with the first cover 160a.

When the user presses down the key cap 120a, the key cap 120a, the positioning base 150a and the first cover 160a move toward the base plate 110, and the second side protrusion 172 of the second cover 170 slides toward the inner surface 122 of the key cap 120a. When the first cover 160a is structurally interfered with the base plate 110, the second cover 170a stops sliding. Then, the first side protrusion 164 of the first cover 160a slides toward the internal surface 122 of the key cap 120a. When the first side protrusion 164 of the first cover 160a is structurally interfered with the internal surface 122 of the key cap 120, the first cover 160a stops sliding. At the time, the second side protrusion 172 of the second cover 170 moves to one side of the first cover 160a close to the first side protrusion 164 and is structurally interfered with the inner surface 122 of the key cap 120a.

After the pressing force applied to the key cap 120a is removed, the elastic force of the spring 140 drives the key cap 120a and the positioning base 150a to move away from the base plate 110. When the first side protrusion 164 of the first cover 160a is structurally interfered with the first limiting portion 153 of the positioning base 150a and the second side protrusion 172 of the second cover 170 is structurally interfered with the second limiting portion 165 of the first cover 160a, the key cap 120a stops moving away from the base plate 110. In this way, the first side protrusion 164 of the first cover 160a is limited to slide between the inner surface 122 of the key cap 120a and the first limiting portion 153 of the positioning base 150a, and the second side protrusion 172 of the second cover 170 is limited to slide between the inner surface 122 of the key cap 120a and the second limiting portion 165 of the first cover 160a.

In summary, in the key structure of the invention, the two ends of the spring are respectively inserted into the positioning base and the second cover, and the spring penetrates the first cover. Accordingly, the spring protected by the positioning base, the first cover and the second cover is less likely to be broken or damaged. On other hand, in an embodiment, the second cover has a degree of freedom of movement to slide relative to the positioning base and the first cover. In another embodiment, the second cover has a degree of freedom of movement to slide relative to the first cover, and the first cover has a degree of freedom of movement to slide relative to the positioning base. As a result, the engagement of the positioning base, the first cover and the second cover can be used to guide the compression and recovery directions of the spring to prevent the key cap moving up and down relative to the base plate from being deflected, thereby improving stability when the user is operating with the key structure.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A key structure, comprising:
    a base plate;
    a key cap, disposed above the base plate;
    a scissor, abutting against the base plate and the key cap, and located between the base plate and the key cap;
    a spring, abutting against the key cap, and located between the base plate and the key cap;
    a positioning base, connected to the key cap, and located between the base plate and the key cap, wherein the positioning base has a positioning groove, and a part of the spring is located in the positioning groove;
    a first cover, connected to the positioning base, and located between the base plate and the key cap, wherein the first cover has a through hole overlapped with the positioning groove, and the spring penetrates the through hole; and
    a second cover, slidably connected to the first cover, and located between the base plate and the key cap, wherein the second cover penetrates the through hole and abuts against the base plate, and another part of the spring abuts against the second cover and is covered by the second cover.

2. The key structure according to claim 1, wherein the part of the spring is inserted into the positioning groove and abuts against the key cap, and the another part of the spring is inserted into and abuts against the second cover.

3. The key structure according to claim 2, wherein the key cap comprises a positioning protrusion, and the positioning protrusion faces the base plate, wherein the positioning protrusion is located in the positioning groove, and the part of the spring is slipped onto the positioning protrusion.

4. The key structure according to claim 1, wherein the first cover comprises a limiting portion, the limiting portion surrounds the through hole, and an orthographic projection of the limiting portion on the key cap falls in the positioning groove,
    the second cover comprises a side protrusion, wherein the side protrusion is slidably disposed in the positioning groove, and configured to slide between the key cap and the limiting portion.

5. The key structure according to claim 4, wherein the first cover further comprises a plurality of hooking portions surrounding the limiting portion, and the plurality of hooking portions are engaged with the positioning base and located outside the positioning groove.

6. The key structure according to claim 1, wherein the positioning base further comprises a first limiting portion, and an orthographic projection of the first limiting portion on the key cap falls in the positioning groove,
    the first cover comprises a first side protrusion, wherein the first side protrusion is slidably disposed in the positioning groove, and configured to slide between the key cap and the first limiting portion.

7. The key structure according to claim 6, wherein the first cover further comprises a second limiting portion opposite to the first side protrusion, the second limiting portion surrounds the through hole, and an orthographic projection of the second limiting portion on the key cap falls in the positioning groove,
    the second cover comprises a second side protrusion, wherein the second side protrusion is slidably disposed in the first cover, and configured to slide between the key cap and the second limiting portion.

8. The key structure according to claim 1, wherein the key cap comprises a first engaging portion facing the base plate, the positioning base comprises a second engaging portion, and the second engaging portion is engaged with the first engaging portion.

9. The key structure according to claim 1, wherein the scissor surrounds the spring, the positioning base, the first cover and the second cover.

10. The key structure according to claim 1, wherein the spring penetrates the first cover and is inserted into the second cover.

* * * * *